(12) United States Patent
Hiraiwa (10) Patent No.: US 7,108,629 B2
(45) Date of Patent: Sep. 19, 2006

(54) MULTI-STAGE PLANETARY GEAR TRAIN

(76) Inventor: Kazuyoshi Hiraiwa, 6-5-8, Tomioka-Nishi,Kanazawa-Ku, Yokohama (JP)

( * ) Notice: Subject to any disclaimer, the term of this patent is extended or adjusted under 35 U.S.C. 154(b) by 221 days.

(21) Appl. No.: 10/851,962

(22) Filed: May 24, 2004

(65) Prior Publication Data

US 2004/0229725 A1    Nov. 18, 2004

(51) Int. Cl.
*F16H 3/62*    (2006.01)
(52) U.S. Cl. .................. 475/288; 475/284; 475/285
(58) Field of Classification Search ............... 475/284, 475/285, 288, 298, 296
See application file for complete search history.

(56) References Cited

U.S. PATENT DOCUMENTS

2003/0232685 A1* 12/2003 Sugihara et al. ............ 475/269
2005/0130789 A1*  6/2005 Samie et al. ................ 475/284
2005/0130791 A1*  6/2005 Raghavan et al. .......... 475/296

FOREIGN PATENT DOCUMENTS

JP            3-199766    *  8/1991  ................. 475/285

* cited by examiner

Primary Examiner—Ha Ho (57) ABSTRACT

A multi-stage planetary gear train has an upper-side planetary set comprising a sun gear, a ring gear, an outer pinion meshed with the ring gear, an inner pinion meshed with the outer pinion and the sun gear, and a carrier rotatably supporting the pinions; and a lower-side planetary set comprising first, second, third and fourth members that are rotatable. The sun gear is connected with the input shaft, the first member is connected with the ring gear at first-forward speed, the second member is held to the transmission case by connection with the carrier at the first-forward speed and a reverse position and connected with the input shaft at forward speeds higher than 3rd speed, the third member is held to the transmission case by connection with the carrier at second-forward speed and connected with the ring gear at third-forward speed, the fourth member is connected with the output shaft.

18 Claims, 5 Drawing Sheets

|   |   | C-1 | C-2 | C-3 | B-1 | B-2 | OC1 |
|---|---|---|---|---|---|---|---|
| D | 1st | ○ |   |   |   |   | ○ |
|   | 2nd | ○ |   |   | ○ |   |   |
|   | 3rd | ○ | ○ |   |   |   |   |
|   | 4th | ○ |   | ○ |   |   |   |
|   | 5th |   | ○ | ○ |   |   |   |
|   | 6th |   |   | ○ | ○ |   |   |
|   | Rev |   | ○ |   |   | ○ |   |
| L | 1st | ○ |   |   |   | ○ |   |

|   |     | C-1 | C-2 | C-3 | B-1 | B-2 | B-3 | OC1 | OC2 |
|---|-----|-----|-----|-----|-----|-----|-----|-----|-----|
| D | 1st | ○ |   |   |   |   |   | ○ | ○ |
|   | 2nd | ○ |   |   | ○ |   |   |   | ○ |
|   | 3rd | ○ | ○ |   |   |   |   |   | ○ |
|   | 4th | ○ |   | ○ |   |   |   |   | ○ |
|   | 5th | ○ | ○ | ○ |   |   |   |   |   |
|   | 6th |   | ○ | ○ |   |   | ○ |   |   |
|   | 7th |   |   | ○ | ○ |   | ○ |   |   |
| Rev |   |   | ○ |   |   | ○ | ○ |   |   |
| L | 1st | ○ |   |   |   | ○ | ○ |   |   |
|   | 2nd | ○ |   |   | ○ |   | ○ |   |   |
|   | 3rd | ○ | ○ |   |   |   | ○ |   |   |
|   | 4th | ○ |   | ○ |   |   | ○ |   |   |

MULTI-STAGE PLANETARY GEAR TRAIN

BACKGROUND OF THE INVENTION

1. Field of the Invention

The present invention relates to a multi-stage planetary gear train with at least forward 6 speeds that is adapted to an automatic transmission for motor vehicle.

2. Description of the Related Art

A multi-stage planetary gear train of this kind is disclosed in, for example, Japanese patent laying-open publication No. Tokkaihei 04-219553. This gear train has an upper-side planetary gear set providing a first fixed speed ratio and a lower-side planetary gear set of a double-pinion type, obtaining forward 6 speeds by 5 friction elements such as clutches and brakes.

The above known conventional multi-stage planetary gear train, however, encounter such a problem that concentric arrangement of the upper-side and lower-side sets requires the lower-side set to be double-pinion typed like gear trains shown in FIGS. 3 and 13 of the above publication. This restricts a construction of the lower-side set and its design freedom of speed ratios.

It is, therefore, an object of the present invention to provide a multi-stage planetary gear train which overcomes the foregoing drawbacks and can concentrically arrange an upper-side planetary gear set and a lower-side planetary gear set to enhance design freedom of speed ratios and obtain at least forward 6 speeds.

SUMMARY OF THE INVENTION

According to the first aspect of the present invention there is provided a multi-stage planetary gear train comprising: an input shaft; an output shaft; a transmission case; an upper-side planetary gear set that has the input shaft and be capable of changing a rotational speed of the input shaft to output an output speed, the upper-side planetary gear set being a first planetary gear with a first sun gear, a first ring gear with internal teeth, a first outer pinion meshed with the first ring gear, a first inner pinion meshed with the first outer pinion and the first sun gear, and a first carrier rotatably supporting the first and second pinions; a lower-side planetary gear set that has said output shaft and receives the output speed to change a rotational speed of said output shaft, said lower-side planetary gear set having a first member, a second member, a third member, and a fourth member that are rotatable; wherein the first sun gear is connected with the input shaft, the first member being connected with the first ring gear at forward 1st speed, the second member being held to said transmission case by connection with the first carrier at the forward 1st speed and a reverse position and connected with the input shaft at forward speed higher than 3rd speed, the third member being held to the transmission case by connection with the first carrier at forward 2nd speed and connected with the first ring gear at the forward 3rd speed, the fourth member being connected with the output shaft.

Preferably, a multi-stage planetary gear train further comprising: a first brake that connects the first carrier and the third member with each other; and a second brake that connects the first carrier and the second member with each other; wherein the first and second brakes are arranged between the upper-side and lower-side planetary ear sets.

Preferably, a multi-stage planetary gear train further comprising: a first one-way clutch that is arranged in a parallel relation with the first brake and connects the first carrier and the second member with each other in one rotational direction.

Preferably, a multi-stage planetary gear train further comprising: a third brake arranged between the first carrier and the transmission case to hold the first carrier to the transmission case; and a second one-way clutch that is arranged in a parallel relation with the third brake and hold the first carrier to the transmission case in one rotational direction.

Preferably, the lower-side planetary gear set comprises a second planetary gear and a third planetary gear, the second planetary gear having a second sun gear, a second ring gear, a second pinion meshed with the second sun gear and second ring gear, and a second carrier rotatably supporting the second pinion, the third planetary gear having a third sun gear, a third ring gear, a third pinion meshed with the third sun gear and third ring gear, and a third carrier rotatably supporting the third pinion, and the second ring gear is the first member, the third carrier being the second member, the second sun gear and the third sun gear connected with the second sun gear being the third members, and the second carrier and the third ring gear connected with the second carrier being the fourth members.

Preferably, the ower-side planetary gear set comprises a second sun gear, a second ring gear, a third ring gear, a second inner pinion meshed with the second ring gear and the second sun gear, a third outer pinion meshed with the second inner pinion and the third ring gear, and a second carrier rortatably supporting the second inner pinion and the third outer pinion, and the second ring gear is the first member, the third ring gear being the second member, the second sun gear being the third member, and the second carrier being the fourth member.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

The embodiments of this invention will be described in detail with the accompanying drawings. Throughout the following detailed description, similar reference characters and numbers refer to similar elements in all figures of the drawings, and their descriptions will be omitted for avoiding duplication.

Figure 1:
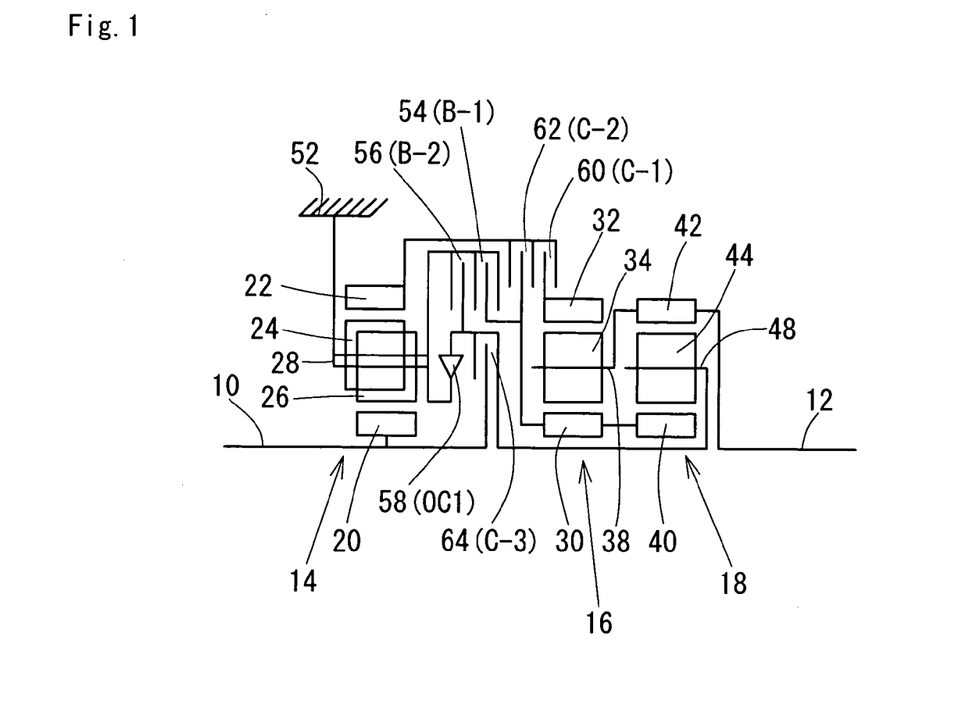
FIG. 1 is a schematic diagram showing a multi-stage planetary gear train of a first embodiment according to the present invention.

FIG. 1 is a schematic diagram showing a multi-stage planetary gear train of a first embodiment according to the present invention. This drawing shows an upper half of the gear train beyond the coaxial axis of an input and output shaft thereof.

The gear train has the input shaft 10, the output shaft 12 arranged in concentric with the input shaft 10, and three sets of planetary gears consisting of a first planetary gear 14, a second planetary gear 16, and a third planetary gear 18.

The first planetary gear 14 functions as an upper-side planetary gear set of the present invention, and the second and third planetary gears 16 and 18 as a lower-side planetary gear set of the present invention.

The first planetary gear 14, double-pinion typed, comprises a first sun gear 20, a first ring gear 22 with internal teeth, first outer pinions 24 meshed with the ring gear 22, first inner pinions 26 meshed with the outer pinions 24 and the sun gear 20, and a first carrier 28 rotatably supporting the first inner and outer pinions 26 and 24.

The second planetary gear 16, single-pinion typed, comprises a second sun gear 30, a second ring gear 32 with internal teeth, second pinions 34 meshed with the second sun gear 30 and the second ring gear 32, and a second carrier 38 rotatably supporting the second pinions 34.

The third planetary gear 18, single-pinion typed, comprises a third sun gear 40, a third ring gear 42 with internal teeth, third pinions 44 meshed with the third sun gear 40 and the third ring gear 42, and a third carrier 48 rotatably supporting the second pinions 44.

The second and third planetary gears 16 and 18 function as the lower-side planetary gear train of the present invention, and constitute a Simpson planetary gear set.

The first sun gear 20 is connected with the input shaft 10. The first carrier 28, fixed to a transmission case 52, is connectable with the second sun gear 30 through a first brake 54 and with the third carrier 48 through a second brake 56 and a first one-way clutch 58. Note that the one-way clutch 58 connects the first carrier 28 and the third carrier 48 with each other only in one rotational direction, while it disconnects them in the other direction.

The second and third sun gears 30 and 40 are always connected with each other. The second and third sun gears 30 and 40 and the third carrier 48 can be fixed to the transmission case 52 and are connectable with the first carrier 28 fixed to the case 52.

The first ring gear 22 is connectable with the second ring gear 32 through a first clutch 60, and with the second sun gear 30 through a second clutch 62.

The input shaft 10 is connectable with the third carrier 48 through a third clutch 64. The second carrier 38 is always connected with the third ring gear 42 and the output shaft 12.

The operation of the multi-stage planetary gear train of FIG. 1 will be described with reference to an operation table shown in FIG. 2 and a common speed-axis diagram shown in FIG. 3.

In the description below, the clutches and the brakes are referred as friction elements. The sun gears, the ring gears, and the carrier are referred as rotatable members, and the friction elements, the one-way clutch, and the like, which can engage the rotatable members with each other, as engaging elements.

Figure 2:
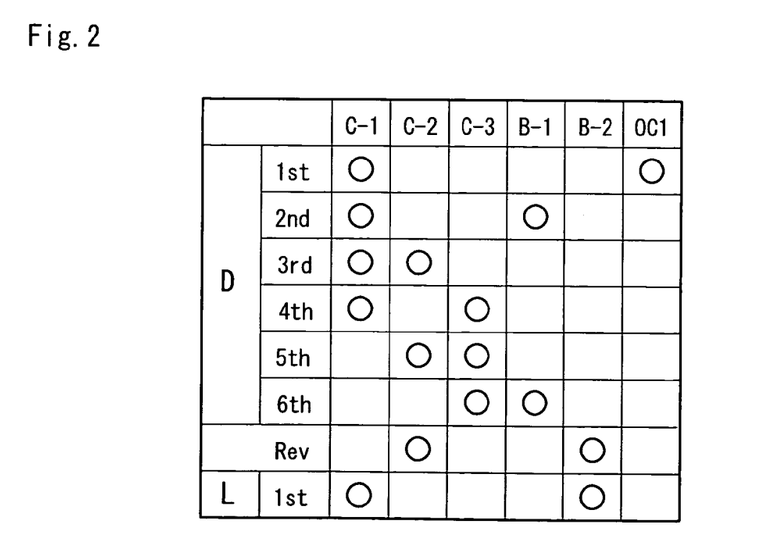
FIG. 2 is a diagram showing an operation table of the gear train of FIG. 1.

The operation table of FIG. 2 shows the engaging elements, such as the clutches, the brakes, and the one-way clutch, in the transverse direction of the table, and select-lever positions, Drive (D) position including forward 1st speed to 6th speed, Reverse (Rev) position, and Low (L) position in the vertical direction of the table. In L position, the input shaft 10 side of the gear train can be driven from the output shaft 12, as well as at engine-braking described later.

In this table, for example, the first clutch 60 is denoted by C-1, the first brake 54 by B-1, the first one-way clutch 58 by OC1, and so on. Note that a relation between the number of each engaging element and its corresponding sign are shown in FIG. 1. Engagement of the engaging element denotes ○ in the table, while disengagement denotes blank space.

Figure 3:
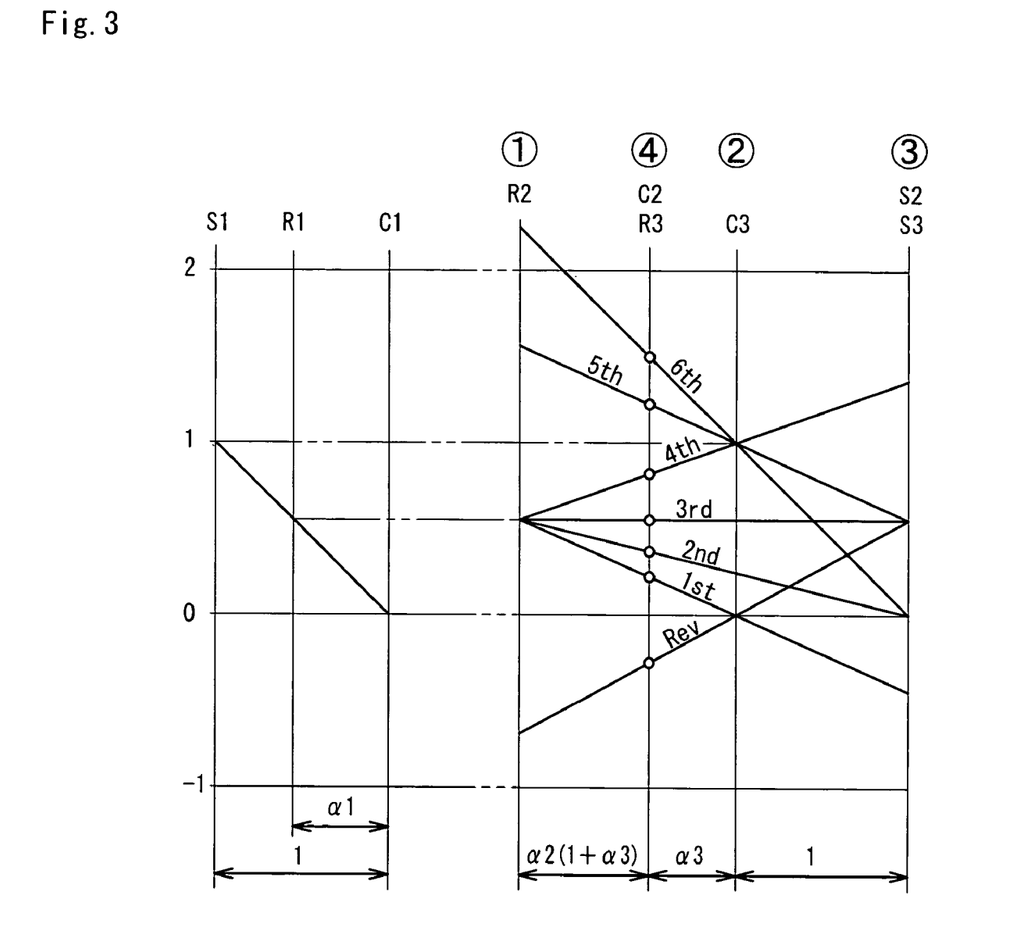
FIG. 3 is a common speed-axis diagram showing a relation among speeds of rotatable elements of the gear train of FIG. 1.

The common speed-axis diagram of FIG. 3 shows in its vertical direction rotational speed of each rotatable member in case of the rotational speed of the input shaft 10 to be 1, and in its transverse direction the axes of each rotatable member arranged to have spaces according to teeth ratios of the sun gears and the ring gears of the planetary gears.

The vertical axes in the diagram have the signs of the rotatable members on their tops; the sun gears are denoted as S, the ring gears as R, and the carriers as C, and their after-attached numbers 1, 2, 3 showing what planetary gear the rotatable member belongs to. For example, S1, R1, C1 respectively stand for the first sun gear 20, the first ring gear 22, and the first carrier 28 of the first planetary gear 14.

The numbers surrounded with a circle denote a first to fourth member, which will be described in detail later, for example, ① denotes the first member.

The teeth ratios are calculated by Zs/Zr, where Zs is the teeth number of the sun gear and Zr is the teeth number of the ring gear; $\alpha 1$ is the teeth ratio of the first planetary gear 14, $\alpha 2$ the teeth ratio of the second planetary gear 16, and $\alpha 3$ the teeth ratio of the third planetary gear 18. For example, in this embodiment, $\alpha 1$ is designed to be 0.55, $\alpha 2$ to be 0.50, $\alpha 3$ to be 0.50.

In the common speed-axis diagram, the heights of the intersections of the vertical axes and thick lines show the rotational speeds and their rotational direction of the rotatable members respectively. The chain double-dashed horizontal lines denote that two rotatable members linked by the horizontal lines are connected with each other to rotate at the same speed.

For easy understanding, signs ○ are put on the intersections of the thick lines and the vertical axis of the second carrier (C2) 38 and the third ring gear (R3) 42, both connected with the output shaft 12.

In the first planetary gear 14, the upper-side planetary gear set, as the first carrier 28 is fixed to the case 52, the first ring gear 22 is driven at reduction gear ratio $1/\alpha 1$ and always rotated at lower speed than the input shaft 10.

At the forward 1st speed, as shown in the operation table in FIG. 2, the first clutch 60 is applied to connect the first ring gear 22 and the second ring gear 32 with each other, and at the same time the first one-way clutch 58 is automatically applied to fix the third carrier 48 to the case 52 through the first carrier 28. Namely, the third carrier 48 is held to the case 52 in the drive direction to accelerate a vehicle by the application of the first one-way clutch 58. This also means that the output shaft 12 side of the gear train can not drive the input shaft 10 side at the 1st speed in the D position, which can not obtain engine braking. At the 1st speed, the upper-side planetary gear set reduces an inputted speed, then also the lower-side planetary gear set reduces the speed outputted from the upper-side set; the rotational speed of the first sun gear 20 rotated at the same speed as the input shaft 10 is reduced at the first ring gear 22, and the first ring gear 22 with reduced speed drives the second ring gear 32 through the first clutch 60. The speed of the second ring gear 32 is also reduced at the second carrier 38 and the third ring gear 42, both connected with the output shaft 12. The speed ratio, the rotational speed ratio of the input shaft 10 and the output shaft 12, at the 1st speed is $\{(1+\alpha 2)+\alpha 2/\alpha 3\}/\alpha 1$; it is 4.545 for the above-given teeth ratios in this embodiment.

Referring to the diagram of FIG. 3, in the first planetary gear 14 shown at the left part of the drawing, let the rotational speed of the first sun gear (S1) 20 be 1 and the speed of the first carrier (C1), as being fixed to the case 52, to be 0, the heights of the intersection of the thick diagonal line and the vertical line of the first ring gear (R1) 22 shows the speed of the first ring gear 22.

Namely, the speed of the second ring gear (R2) 32 is the same as the first ring gear 22, as both being connected with each other, and the speed of the third carrier (C3) 48 is zero as being held to the case 52. The thick diagonal line, denoted as 1st and connecting the speed of second ring gear 32 and zero of the third carrier 48, intersects the vertical line of the second carrier 38 and the third ring gear (R3) 42, and the height of its intersection becomes the speed of the output shaft 12.

Note that a rotatable member that is connected with the first ring gear 22 at the 1st speed functions as a first member of the present invention; the first member is the second ring gear 32 in this first embodiment. The first member is kept in connection with the first ring gear 22 during the forward 1st to 4th speed.

A rotatable member that is fixed to the case 52 through the first carrier 28 at the 1st speed functions as a second member of the present invention; the second member is the third carrier 48 in this embodiment. The second member is held to the case 52 at the reverse position, which will be described later, and connected with the input shaft 10 at the forward 4th speed and higher.

To shift from the 1st to the 2nd speed, the first brake 54 is applied to hold the second sun gear 30 and the third sun gear 40 to the case 52 in addition to the application of the first clutch 60 as well as at the forward 1st speed. This holding results in that the speed ratio changes in the lower-side set from the reduction ratio of the 1st speed to the reduction ratio of the 2nd speed. At this time, the third carrier 48 is free from the case 52 due to the automatic disengagement of the first one-way clutch 58.

Namely, in the diagram of FIG. 3, the thick diagonal line denoted as 2nd passes through the point of the second sun gear (S2) 30 and the third sun gear (S3) 40 with speed zero. The speed ratio at the forward 2nd speed is $(1+\alpha 2)/\alpha 1$; it is 2.727 for the above-given teeth ratios in this embodiment.

As described above, shifting from the 1st to the 2nd speed requires only application of the first brake 54 because the first one-way clutch 58 automatically changes from its application to release.

Note that a rotatable member that is held to the case 52 by connection with the first carrier 28 at the forward 2nd speed functions as a third member of the present invention; the third member is the second sun gear 30 in this embodiment. The third member is also fixed to the case 52 at the 6 the speed, and connected with the first ring gear 22 at the forward 3rd, the 5th speed, and the reverse position.

To shift from the 2nd speed to the 3rd speed, the first brake 54 is released and the second clutch 62 is applied. At this speed, the second sun gear 30 as the third member is connected with the first ring gear 22.

The first clutch 60 and the second clutch 62, both being applied, becomes the lower-side set to rotate as one unit, whose thick line becomes horizontal line as shown in the right part of the drawing of FIG. 3. Accordingly, the speed ratio at the forward 3rd speed is $1/\alpha 1$, which are equal to the speed ratio of the upper-side set; it is 1.818 for the above-given teeth ratios in this embodiment.

To shift from the 3rd to the 4th speed, the second clutch 62 is released and the third clutch 68 is applied. At this speed, the third carrier 48 as the second member is connected with the input shaft 10 and also kept its connection at the speeds higher than 4th.

In the diagram of FIG. 3, the thick diagonal line denoted as 4th passes through the point of the third carrier 48 with a speed of 1 equal to the input shaft 10 and the point of the second ring gear 32 as the first member. The speed ratio at the 4th speed is $(A+\alpha 3)/\{\alpha 1(A+\alpha 3)+A(1-\alpha 1)\}$, where A is $\alpha 2(1+\alpha 3)$; it is 1.220 for the above-given teeth ratios in this embodiment.

To shift from the 4th to the 5th speed, the first clutch 60 is released and the second clutch 62 is applied again. At this speed, the second sun gear 30 and the third sun gear 40 both as the third members are connected with the first ring gear 22 again.

In the diagram of FIG. 3, the thick diagonal line denoted as 5th passes through the point of the second and third sun gears (S2 and S3) 30 and 40 with the same speed as the first ring gear (R1) 22 and the point of the third carrier (C3) 48.

The speed ratio at the forward 5 the speed is $1/(1+\alpha 3-\alpha 1\cdot\alpha 3)$; it is 0.816, over-drive ratio, for the above-given teeth ratios in this embodiment.

To sift from the 5th to the 6th speed, the second clutch 62 is released and the first brake 54 is applied to hold the second and third sun gears 30 and 40 as the third members to the case 52.

In the diagram of FIG. 3, the thick diagonal line denoted as 6th passes through the point of the second and third sun gears (S2 and S3) 30 and 40 with a speed of 0 and the point of the third carrier (C3) 48 with a speed of 1. The speed ratio at the forward 6th speed is 0.667, over-drive ratio, for the above-given teeth ratios in this embodiment.

To select the Rev position, the second clutch 62 and the second brake 56 are applied. At this selection, the third carrier 48 as the second member is held to the case 52, and the second and third sun gears 30 and 40 as the third members are connected with the first ring gear 22 to be an input member of the lower-side set.

In the diagram of FIG. 3, the thick diagonal line denoted as Rev is shown. The speed ratio at the reverse position is $-1/(\alpha 1\cdot\alpha 3)$; it is -3.636 for the above-given teeth ratios in this embodiment.

To select the L position, the first clutch 60 and the second brake 56 are applied. The thick diagonal line denoted as 1st as well as 1st speed in D position. At this L position, the output shaft 12 side of the gear train can drive the input shaft 10 side to obtain engine braking, where the third carrier 48 is held to the case 52 whichever direction torque applies to the gear train.

Note that a rotatable member that is always connected with the output shaft 12 functions as a fourth member of the present invention. In this embodiments, the second carrier 38 and the third ring gear 42 are the fourth members.

The speed ratios at each speed and each gear steps, relation between the speed ratios of two neighboring speeds, are as follows: the 1st speed ratio is 4.545, the 2nd 2.727, the 3rd 1.818, the 4th 1.220, the 5th 0.816, the 6th 0,677, and the Rev −3.636 where $\alpha_1$ is 0.550, $\alpha_2$ 0.500, $\alpha_3$ 0.500, and the ratio step between the 1st and the 2nd is 1.667, the ratio step between the 2nd and the 3rd 1.500, the ratio step between the 3rd and the 4th 1.491, the ratio step between the 4th and the 5th 1.494, and the ratio step between the 5th and the 6th 1.224. These ratio steps generally become almost smaller as the speed is higher, which is preferable for speed ratios of a transmission of a motor vehicle with an internal-combustion engine.

The gear train of this embodiment can obtain an easily-controlled and smooth shift by using the first one-way clutch 58 and the forward 6 speeds and the reverse 1 speed by using five friction elements. The gear train can be designed in compact; as the input member of the lower-side set, to which large torque applies at the forward 1st speed, is the second ring gear 32 with a large diameter, its dedendum stress is reduced, and the first brake 54, the second brake 56, and the first one-way clutch 58 are arranged between the upper-side and lower-side sets.

In addition, the Simpson gear train of the lower-side set can be designed to have a wide selection of speed ratios, suitable for a passenger car to a commercial car, or for emission control of an internal-combustion engine and fuel saving. Further, the gear train has an input shaft 10 and an output shaft 12 to be arranged in concentric with each other, which can be easily adapted to a transmission for a front-engine and front-drive (FR) vehicle.

Next, a multi-stage planetary gear train of a second embodiment will be described with reference to drawings of FIGS. 4 and 5.

This gear train has a third brake 66 and a second one-way clutch 68, which are arranged in parallel relation with each other and between a transmission case 52 and a first carrier 28. The rest construction of the gear train is similar to the first embodiment.

Figure 5:
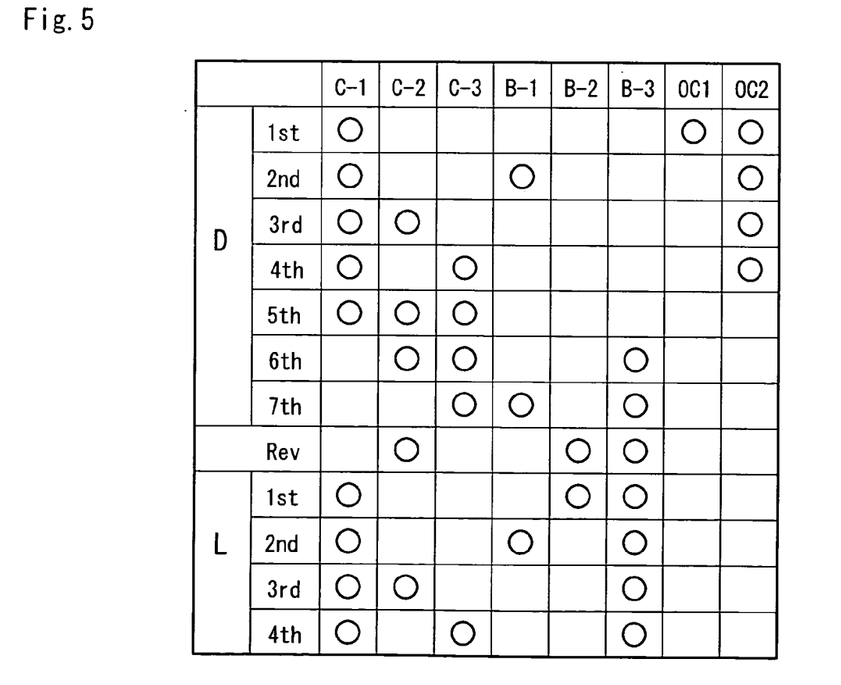
FIG. 5 is a diagram showing an operation table of the gear train of FIG. 4.

The second one-way clutch (OC2) 68 is automatically applied to hold the first carrier 28 to the case 52 when accelerating at forward 1st to 4th speed, while the third brake (B3) 66 is applied as shown in an operation table of FIG. 5.

This results in that the first carrier 28 can be rotated, which enables the upper-side and lower-side sets to be rotated as one unit to obtain a direct drive with a speed ratio of 1. Namely, when three friction elements or more among a first to third clutches 60, 62, and 64, and a first and second brakes 54 and 56 are applied, the upper-side and lower-side sets are rotated as one unit at a direct speed ratio of 1.

For example, at the forward 5th speed, as shown in FIG. 5, the first clutch 60, the second clutch 62, and the third clutch 64 are applied, which results in that a drive with a speed ratio of 1 can be obtained at the 5th speed.

The operations of the gear train at the forward 6th and 7th speed in FIG. 5 are respectively the similar to the 5th and 6th of the first embodiment, which results in that the corresponding speed ratios are the same. The gear train of the second embodiment, therefore, has forward 7 speeds and a reverse 1 speed by using six friction elements and two one-way clutches, or by adding the third brake 66 and the second one-way clutch 68 to the first embodiment. The first to fourth members are the same as the first embodiment.

The gear train of the second embodiment can obtain the same advantages as the first embodiment. In addition, it has forward 7 speeds, which can have ratio steps smaller than the first embodiment at the 4th speed or higher, improving fuel consumption and emission level.

Figure 6:
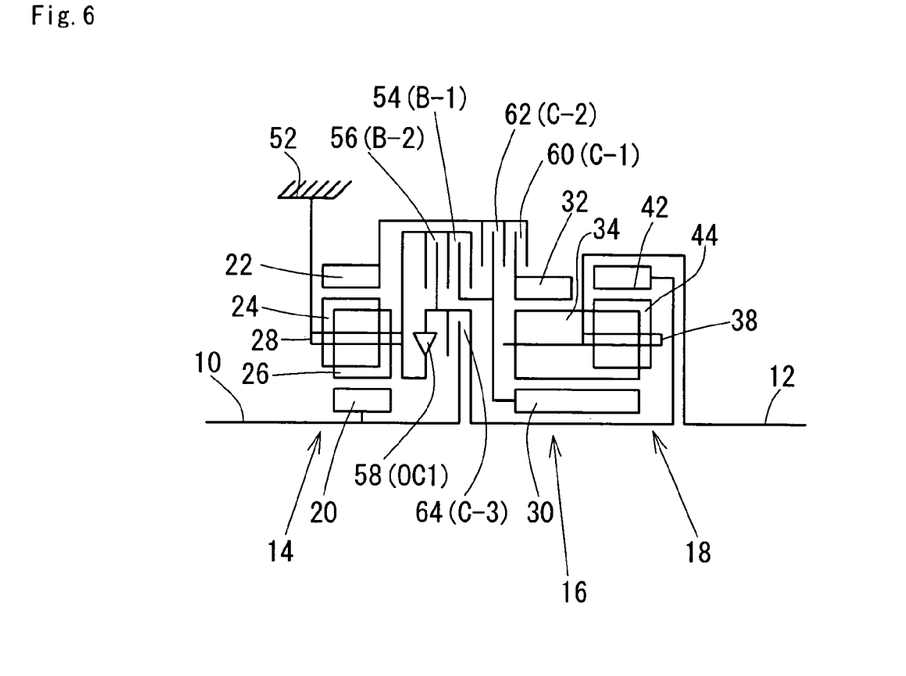
FIG. 6 is a schematic diagram showing a multi-stage planetary gear train of a third embodiment according to the present invention.

A multi-stage planetary gear train of a third embodiment will be described with reference to drawing of FIG. 6.

The operation of the gear train is performed in according to the operation table of FIG. 2.

This gear train has a lower-side planetary gear set different from the first embodiment shown in FIG. 1, Ravigneaux planetary gear set. Namely, it is double-pinion typed and has second pinions 34 longer than the first embodiment and meshed with a second sun gear 30, third pinions 44 meshed with the second pinions 34 and a third ring gear 42, and a second carrier 38 rotatably supporting the second and third pinions 34 and 44.

A second ring gear 32 functions as a first member of the present invention and is connected with a first ring gear 22 at forward 1st to 4th speed as well as the first embodiment of FIG. 1. The third ring gear 42 functions as a second member of the present invention, which is different from the first embodiment. This gear 42 is held to a transmission case 52 by connection with the first carrier 28 at the forward 1st speed and a reverse position and connected with an input shaft 10 at the forward 4th or higher.

The second sun gear 30 functions as a third member of the present invention. This gear 30 is held to the case 52 through the first carrier 28 at the forward 2nd and 6th speeds and connected with the first ring gear 22 at the forward 3rd and 5th speeds and the reverse position. The second carrier 38 functions as a fourth member of the present invention, which is different from the first embodiment, and is always connected with an output shaft 12.

To illustrate a common speed-axis diagram of this embodiment, the first to fourth members are replaced according to the above-explanation in the lower-side set shown at the right part of the drawing of FIG. 3. This results in that although calculation formulas are different from the first embodiment, the same speed ratios can be obtained by setting teeth ratios of the lower-side set the neighboring vertical axes to have the same distances therebetween as the first embodiment.

The gear train of this embodiment has forward 6 speeds and the reverse 1 speed, and the advantages similar to the first embodiment.

Figure 7:
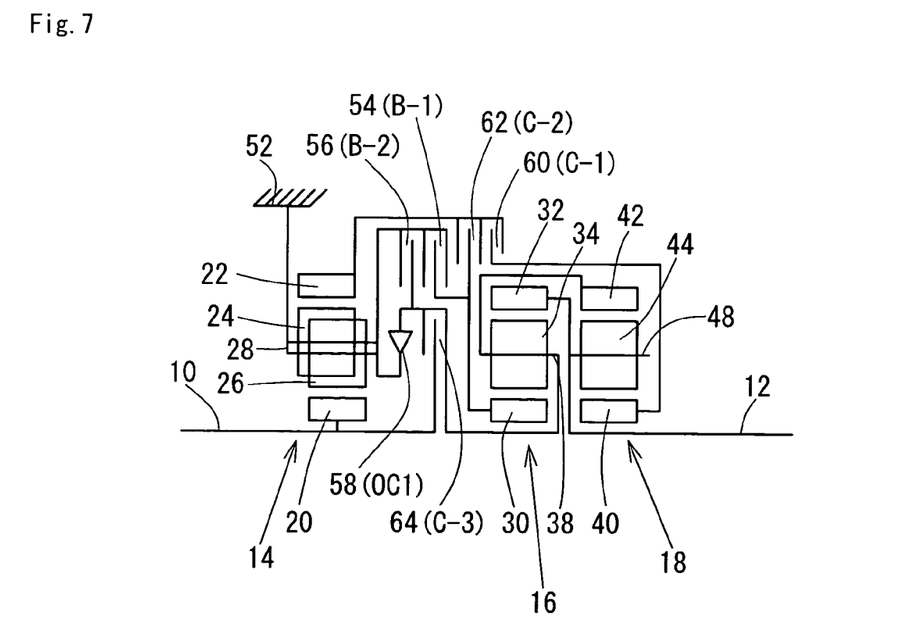
FIG. 7 is a schematic diagram showing a multi-stage planetary gear train of a fourth embodiment according to the present invention.

A multi-stage planetary gear train of a fourth embodiment will be described with reference to the drawing of FIG. 7. This operation is performed according to the operation table shown in FIG. 2.

The gear train has a lower-side planetary gear set different from the first embodiment. Namely, a third sun gear 40 functions as a first member of the present invention and is connected with the first ring gear 22 at forward 1st to 4th speed.

A second carrier 38 and a third ring gear 42, both connected with each other, function as second members of the present invention. They are held to a transmission case 52 by connection with a first carrier 28 at the forward 1st and a reverse position and connected with an input shaft 10 at the forward 4th speed or higher.

A second sun gear 30 functions as a third member of the present invention. The gear 30 is held to the case 52 through the first carrier 28 at the forward 2nd and 6th speed and always connected with an output shaft 12 at the forward 3rd and 5th speed and the reverse position.

A second ring gear 32 and a third carrier 48, both connected with each other, function as fourth members of the present invention and are always connected with the output shaft 12.

In this embodiment, although the rotatable members corresponding to the first to fourth members are different from the first embodiment shown in FIG. 1, the first to fourth members are respectively connected with the rotatable members of an upper-side planetary gear set in the same connection relation as the first embodiment. The gear train is operated according to the operation table of FIG. 2.

This results in that although calculation formulas are different from the first embodiment, this gear train, to which the same common speed-axis diagram as FIG. 3 of the first embodiment can be applied, has forward 6 speeds and the reverse 1 speed by using five friction elements, obtaining same advantages as the first embodiment.

Figure 8:
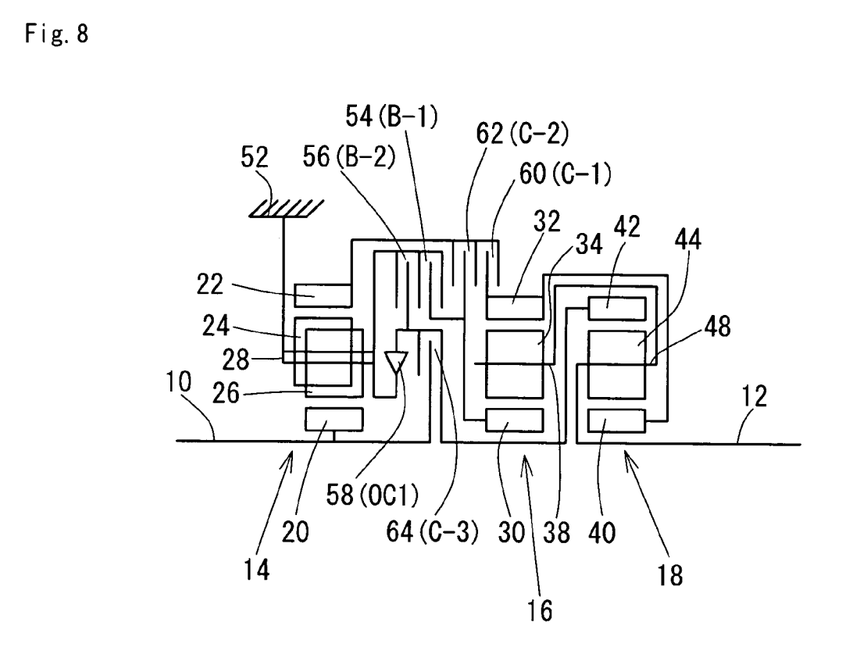
FIG. 8 is a schematic diagram showing a multi-stage planetary gear train of a fifth embodiment according to the present invention.

A multi-stage planetary gear train of a fifth embodiment of the present invention will be described with reference to the drawing of FIG. 8.

This gear train has a lower-side planetary gear set different from the first embodiment. Namely, a third sun gear 4o and a second ring gear 32, both connected with each other, function as first members of the present invention and are connected with a first ring gear 22 at forward 1st to 4th speed.

A third ring gear 42 functions as a second member of the present invention and is held to a transmission case 52 by connection with a first carrier 28 at the forward 1st speed and a reverse position, and connected with an input shaft 10 at the forward 4th speed or higher.

A second sun gear 30 functions as a third member and is held to the case 52 through the first carrier 28 at the forward 2nd and 6th speed, and connected with the first ring gear 22 at the forward 3rd and 5th speed and the reverse position.

A second carrier 38 and a third carrier 48, both connected with each other, function as fourth members of the present invention and are always connected with an output shaft 12.

In this embodiment, although the rotatable members corresponding to the first to fourth members are different from the first embodiment shown in FIG. 1, the first to fourth members are respectively connected with the rotatable members of an upper-side planetary gear set in the same connection relation as the first embodiment. The gear train is operated according to the operation table of FIG. 2.

This results in that although calculation formulas are different from the first embodiment, this gear train, to which the same common speed-axis diagram as FIG. 3 of the first embodiment can be applied, has forward 6 speeds and the reverse 1 speed by using five friction elements, obtaining same advantages as the first embodiment.

Figure 9:
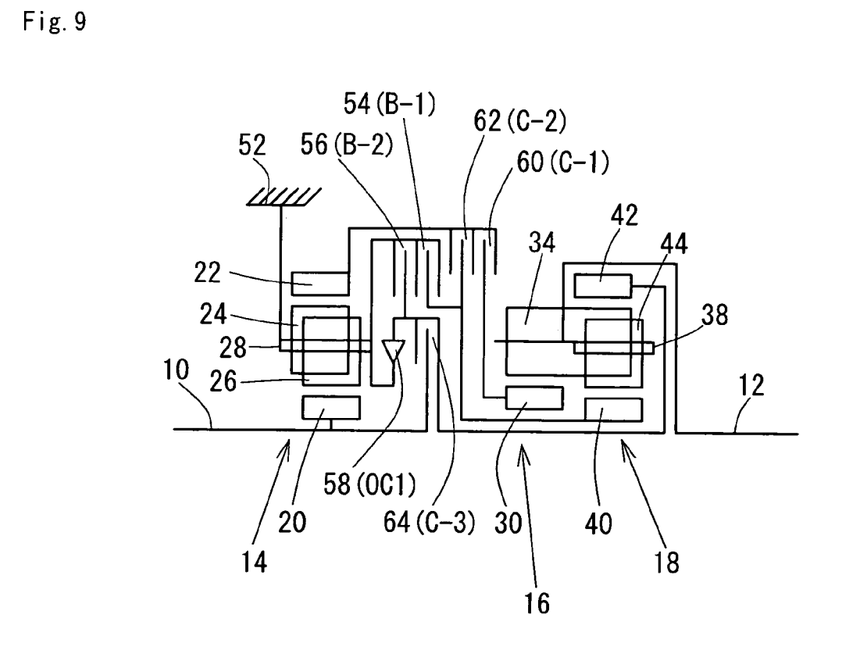
FIG. 9 is a schematic diagram showing a multi-stage planetary gear train of a sixth embodiment according to the present invention.

A multi-stage planetary gear train of a sixth embodiment of the present invention will be described wit reference to the drawing of FIG. 9.

This gear train has a lower-side planetary gear set different from the first embodiment, Ravigneaux planetary gear set. Namely, It lacks a second ring gear, but is provided with a second pinion 34 longer than the first embodiment and meshed with a third ring gear 42, and a third pinion 44 meshed with the second pinion 34 and a third sun ear 40.

A second sun gear 30 functions as a first member of the present invention and is connected with a first ring gear 22 at forward 1st to 4th speed.

A second ring gear 32 functions as a second member of the present invention and is held to a transmission case 52 by connection with a first carrier 28 at the forward 1st speed and a reverse position, and connected with an input shaft 10 at the forward 4th speed or higher.

A third sun gear 40 functions as a third member of the present invention and is held to the case 52 through the first carrier 28 at the forward 2nd and 6th speed, and connected with the first ring gear 22 at the forward 3rd and 5th speed and the reverse position.

A second carrier 38 functions as a fourth member of the present invention and always connected with an output shaft 12.

In this embodiment, although the rotatable members corresponding to the first to fourth members are different from the first embodiment shown in FIG. 1, the first to fourth members are respectively connected with the rotatable members of an upper-side planetary gear set in the same connection relation as the first embodiment. The gear train is operated according to the operation table of FIG. 2.

This results in that although calculation formulas are different from the first embodiment, this gear train, to which the same common speed-axis diagram as FIG. 3 of the first embodiment can be applied, has forward 6 speeds and the reverse 1 speed by using five friction elements, obtaining the same advantages as the first embodiment.

The above-described first to sixth embodiments have advantages described below. They can obtain forward 6 speeds and reverse 1 speed by using five friction elements. In these embodiments, the upper-side and lower-side planetary gear sets can be arranged and supported on the concentric axis of the input and output shafts regardless of the construction of the lower-side set, which enhances design freedom of selection of gear train type, its speed ratios, and the like. Therefore, these gear trains can be designed to avoid a large torque to be inputted to its sun gear, for example, like the gear trains shown in FIGS. 1 and 6.

While the invention has been particularly shown and described with reference to preferred embodiments thereof, it will be understood by those skilled in the art that the foregoing and other changes in form and details can be made therein without departing from the spirit and scope of the invention.

Figure 4:
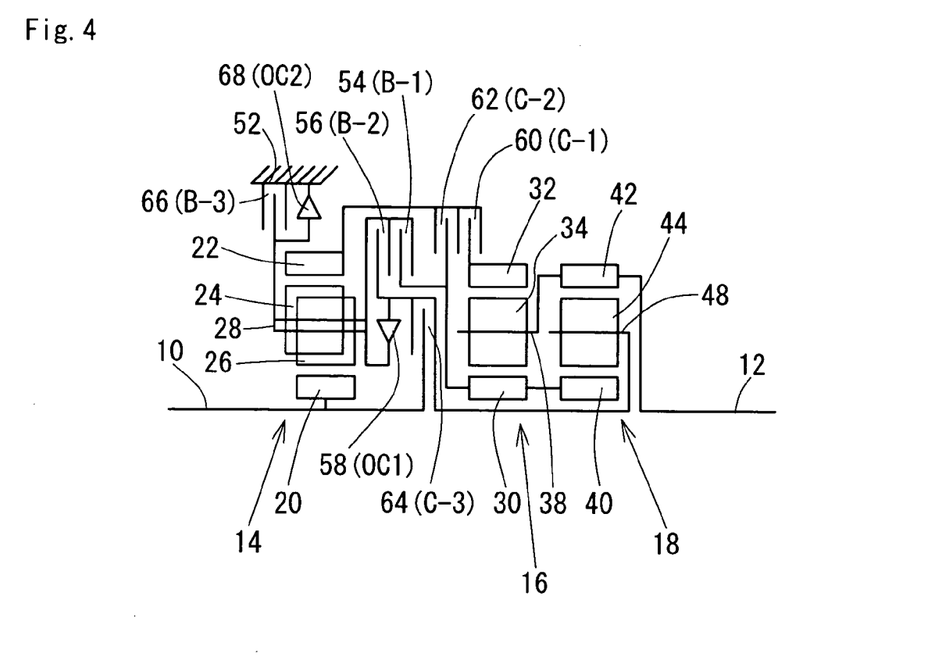
FIG. 4 is a schematic diagram showing a multi-stage planetary gear train of a second embodiment according to the present invention.

For example, the gear trains of the first, and third to sixth embodiments can easily be modified into a forward 7-speed gear train like the second embodiment shown in FIG. 4.

Between an internal-combustion engine, not shown, and an input shaft 10, there may be provided a torque converter or a fluid coupling and a third clutch 64 disposed therein to directly connect a second member and an output shaft of the engine. In this case, it provides a mechanical and fluidic power flow from the engine to the gear train at forward 4th speed or higher, which can remove one friction element disposed in the gear train.

Further, a third one-way clutch and a fourth brake, disposed in parallel relation with a second brake that is capable of connecting a third member and a first carrier with each other, may be added to the gear trains described above, which reduces a shift shock from 2nd to 3rd speed.

What is claimed is:

1. A multi-stage planetary gear train comprising:
   an input shaft;
   an output shaft;
   a transmission case;
   an upper-side planetary gear set that has said input shaft and be capable of changing a rotational speed of said input shaft to output an output speed, said upper-side planetary gear set being a first planetary gear with a first sun gear, a first ring gear with internal teeth, a first outer pinion meshed with the first ring gear, a first inner pinion meshed with the first outer pinion and the first sun gear, and a first carrier rotatably supporting the first and second pinions;

a lower-side planetary gear set that has said output shaft and receives the output speed to change a rotational speed of said output shaft, said lower-side planetary gear set having a first member, a second member, a third member, and a fourth member that are rotatable;

wherein the first sun gear is connected with said input shaft, said first member being connected with the first ring gear at forward 1st speed, said second member being held to said transmission case by connection with the first carrier at the forward 1st speed and a reverse position and connected with said input shaft at forward speed higher than 3rd speed, said third member being held to said transmission case by connection with the first carrier at forward 2nd speed and connected with the first ring gear at the forward 3rd speed, said fourth member being connected with said output shaft.

2. A multi-stage planetary gear train set forth in claim 1 further comprising:
   a first brake that connects the first carrier and said third member with each other; and
   a second brake that connects the first carrier and said second member with each other;
   wherein said first and second brakes are arranged between said upper-side and lower-side planetary gear sets.

3. A multi-stage planetary gear train set forth in claim 2 further comprising:
   a first one-way clutch that is arranged in a parallel relation with said first brake and connects the first carrier and said second member with each other in one rotational direction.

4. A multi-stage planetary gear train set forth in claim 1 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

5. A multi-stage planetary gear train set forth in claim 2 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

6. A multi-stage planetary gear train set forth in claim 3 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

7. A multi-stage planetary gear train set forth in claim 1, wherein said lower-side planetary gear set comprises a second planetary gear and a third planetary gear, said second planetary gear having a second sun gear, a second ring gear, a second pinion meshed with the second sun gear and second ring gear, and a second carrier rotatably supporting the second pinion, said third planetary gear having a third sun gear, a third ring gear, a third pinion meshed with the third sun gear and third ring gear, and a third carrier rotatably supporting the third pinion, and wherein the second ring gear is said first member, the third carrier being said second member, the second sun gear and the third sun gear connected with the second sun gear being said third members, and the second carrier and the third ring gear connected with the second carrier being said fourth members.

8. A multi-stage planetary gear train set forth in claim 7 further comprising:
   a first brake that connects the first carrier and said third member with each other; and
   a second brake that connects the first carrier and said second member with each other;
   wherein said first and second brakes are arranged between said upper-side and lower-side planetary gear sets.

9. A multi-stage planetary gear train set forth in claim 8 further comprising:
   a first one-way clutch that is arranged in a parallel relation with said first brake and connects the first carrier and said second member with each other in one rotational direction.

10. A multi-stage planetary gear train set forth in claim 7 further comprising:
    a third brake arranged between the first carrier and said transmission case to hold the first carrier to said transmission case; and
    a second one-way clutch that is arranged in a parallel relation with said third brake and hold the first carrier to said transmission case in one rotational direction.

11. A multi-stage planetary gear train set forth in claim 8 further comprising:
    a third brake arranged between the first carrier and said transmission case to hold the first carrier to said transmission case; and
    a second one-way clutch that is arranged in a parallel relation with said third brake and hold the first carrier to said transmission case in one rotational direction.

12. A multi-stage planetary gear train set forth in claim 9 further comprising:
    a third brake arranged between the first carrier and said transmission case to hold the first carrier to said transmission case; and
    a second one-way clutch that is arranged in a parallel relation with said third brake and hold the first carrier to said transmission case in one rotational direction.

13. A multi-stage planetary gear train set forth in claim 1, wherein said lower-side planetary gear set comprises a second sun gear, a second ring gear, a third ring gear, a second inner pinion meshed with the second ring gear and the second sun gear, a third outer pinion meshed with the second inner pinion and the third ring gear, and a second carrier rortatably supporting the second inner pinion and the third outer pinion, and wherein the second ring gear is said first member, the third ring gear being said second member, the second sun gear being said third member, and the second carrier being said fourth member.

14. A multi-stage planetary gear train set forth in claim 13 further comprising:
    a first brake that connects the first carrier and said third member with each other; and
    a second brake that connects the first carrier and said second member with each other;
    wherein said first and second brakes are arranged between said upper-side and lower-side planetary gear sets.

15. A multi-stage planetary gear train set forth in claim 14 further comprising:
   a first one-way clutch that is arranged in a parallel relation with said first brake and connects the first carrier and said second member with each other in one rotational direction.

16. A multi-stage planetary gear train set forth in claim 13 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

17. A multi-stage planetary gear train set forth in claim 14 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

18. A multi-stage planetary gear train set forth in claim 15 further comprising:
   a third brake arranged between the first carrier and said transmission case to hold the first carrier to said transmission case; and
   a second one-way clutch that is arranged in a parallel relation with said third brake and hold the first carrier to said transmission case in one rotational direction.

* * * * *